United States Patent [19]

Sorrentino et al.

[11] Patent Number: 5,416,252
[45] Date of Patent: May 16, 1995

[54] WASTE INCINERATION RESIDUES AND THE PRODUCTS OBTAINED

[75] Inventors: Francois Sorrentino, Viviers Sur Rhone; Michel Rollet, Saint Cloud; Benoit Kessler, Montelimar; Bernard Robin, Valvigneres; Bernard Jesus, Cruas, all of France

[73] Assignee: Ciments LaFarge, Saint Cloud, France

[21] Appl. No.: 995,390

[22] Filed: Dec. 28, 1992

[30] Foreign Application Priority Data

Dec. 27, 1991 [FR] France ................... 91 16447

[51] Int. Cl.$^6$ ............................................ B09B 3/00
[52] U.S. Cl. ................................... 588/257; 405/128; 588/249
[58] Field of Search ............... 405/128, 258, 263, 264, 405/265, 266; 588/252, 256, 257; 106/606, 607, 611, 612, 636, 641, 680

[56] References Cited

U.S. PATENT DOCUMENTS

| | | | |
|---|---|---|---|
| 3,170,677 | 2/1965 | Phister, Jr. et al. | 259/154 |
| 4,336,069 | 6/1982 | Dodson et al. | 588/256 X |
| 4,367,986 | 1/1983 | Miyoshi et al. | 588/257 |
| 4,695,324 | 9/1987 | Lieberman | 588/252 X |
| 4,741,782 | 5/1988 | Styron | 588/257 |
| 5,150,985 | 9/1992 | Roesky et al. | 405/128 |
| 5,177,305 | 1/1993 | Pichat | 588/256 X |
| 5,242,603 | 9/1993 | Fan | 405/128 X |
| 5,252,003 | 10/1993 | McGahan | 405/128 |

FOREIGN PATENT DOCUMENTS 0369946  5/1990  European Pat. Off. .

*Primary Examiner*—Dennis L. Taylor
*Attorney, Agent, or Firm*—Millen, White, Zelano & Branigan

[57] ABSTRACT

The invention concerns a process for the treatment of incineration residues of urban or industrial wastes comprising the following steps;

a first step of chemical analysis of the incineration residues of urban or industrial wastes in order to determine:
    their water-soluble sulfate content,
    the overall retarding or accelerating action of the water-soluble ions which are liable to hinder the setting or hardening of a Portland cement, a second step in which the urban or industrial waste incineration residues are mixed or crushed, with a hydraulic binder and additives, followed by granulation with water of the mixture obtained with the granules then left to harden, the nature and proportion of said hydraulic binder and said additives having been selected in order to allow both the physical and/or chemical neutralization of the harmful elements for setting or hardening of a Portland cement present in the wastes, as well as the production of granules with low porosity and low permeability.

38 Claims, No Drawings

WASTE INCINERATION RESIDUES AND THE PRODUCTS OBTAINED

BACKGROUND OF THE INVENTION

The present invention concerns a method for the treatment of residues produced by the incineration of urban and industrial wastes, and the products obtained by such a method.

The problems raised by the increasing production of wastes of all types, both by industries and by urbanized areas, are growing in number and in difficulty. Moreover, growing environmental concerns have given rise to laws having strict standards, making it increasingly difficult to dispose of these wastes by direct dumping, by storage, or by underground introduction or burial.

In the future, it must be therefore expected that techniques such as incineration will play a vital role, by offering acceptable means to destroy these wastes in terms of environmental pollution. By employing thermal decomposition by thermal oxidation at high temperature to decompose the organic fractions of the wastes and reduce the volumes, the incineration sometimes also generates its own wastes. The different types of waste incineration residue can be classified into two main categories: slags, which can be upgraded, and flue gas treatment residues. The latter include fly ash and soot taken from a simple dust collector, residues from filter-presses, and dechlorination residues. When the wastes are burned in an incinerator, several types of waste are generated, depending on the waste treatment method. Four methods can be employed for treating flue gas treatment residues: dry and semi-dry method, and semi-wet and wet methods.

In the dry method, a dry, powdery reactant is pneumatically injected. The solid absorbs the pollutants, which are neutralized by dry reaction and at high temperature (200° to 300° C.), and the reaction products and excess reactant must then be collected.

In the semi-dry method, to improve the collection efficiency, the dry reactant is injected into the flue gases that are previously humidified and cooled to 140° to 190° C. in a specific reactor.

In the semi-wet method, a sludge reactant is injected into the flue gases, and a filter system collects the reaction products and excess reactant.

The wet method takes places in three phases:
upstream dust collecting designed to remove the largest dust particles,
gas scrubbing,
treatment of the wash waters.

Waste incineration residues fall into the category of wastes covered by laws enacted to limit air, water and soil pollution, creating a constant need for more efficient systems to make them inert for subsequent disposal in a technical burial center or recycle. Many workers have attempted to develop such systems.

According to a first alternative, it was proposed to mix these wastes with a hydraulic binder with a view to subsequent dumping.

Thus U.S. Pat. No. 4,744,829 describes a method for the production of leach-resistant agglomerates from wastes such as ash and filter dusts, according to which the wastes are finely ground and then introduced into a colloidal suspension of cement. The granules produced from this mixture are hardened to withstand leaching.

The main drawback of such a method resides in the fact that the number of interactions between the waste and the cement is considerably increased by enlarging the contact surface area between the waste and the cement due to intense crushing of the wastes. This means that the anticipated result is only reached if the waste contains virtually no elements that are liable to disturb the setting of the cement. Furthermore, obtaining a colloidal suspension of cement implies the use of a cement that has undergone prior supercrushing and has a high water/cement (W/C) ratio of about 2. In these conditions, the structure of the granules obtained is too porous to withstand leaching successfully.

This first alternative is also described in U.S. Pat. No. 3,947,293, which recommends conditioning the waste incineration residues with Portland cement and lime or Portland cement and calcium sulfoaluminate or sulfate compounds.

In fact, the waste incineration residues may contain elements and compounds which interact with the hydraulic binders, disturbing the setting and hardening processes (delay or acceleration of setting leading to rapid stiffening and consequently a brittle fragile product), or may cause swelling (expansion). Stabilization by hydraulic binders is hence incomplete and ineffective because subsequent leaching is favored by the cracks and/or breaks formed during setting and hardening and also subsequently.

With respect to household residues, the problems that arise are connected with heavy metals such as Hg, Cd, Zn, Cu, Ni and Cr, and with chlorine, sulfate and cyanide ions originating in the main residues: organic matter and plastics, paper and cardboard, textiles, leather and rubber, glasses, metals and batteries.

Each of these ions or metals can cause delays or accelerations in setting and swelling, and these problems tend to deteriorate the cement paste and prevent it from playing its role as a hydraulic binder.

To overcome these drawbacks, a second alternative has been recommended, consisting of adding one or more of the following products to the waste incineration residues, if necessary in a mixture with an additional hydraulic binder: bentonite (U.S. Pat. No. 4,149,968), vermiculite (U.S. Pat. No. 4,113,504), rice husks (Japanese Patent No. 77.110.744), sodium or calcium lignosulfonates (Japanese Patents No. 81.53.796 ) and No. 75.44.977), calcium aluminate (Japanese Patent No. 75.93.264), polyvinyl acetate, aluminum stearate (Japanese Patent No. 79.162.844), sodium bicarbonate (Japanese Patent No. 80.44.355), polymers (Japanese Patent No. 80.29.119 and U.S. Pat. No. 4,174,293), polyvinyl alcohol (Japanese Patent No. 77.111.260), slag and gypsum (U.S. Pat. No. 4,266,980), calcium sulfate (U.S. Pat. No. 3,947,284), calcium chloride (U.S. Pat. No. 1,909,849), water-soluble silicates (U.S. Pat. No. 2,081,541, No. 3,837,872, No. 3,841,102, No. 4,012,320, No. 3,892,636, No. 4,600,514 and No. 4,518,508), systems based on lime and fly ash, lime and clay, or lime and cement kiln dusts (U.S. Pat. No. 3,720,609).

However, the problems of setting and hardening of the hydraulic binder, mentioned above, subsist because the waste incineration residues are not chemically inert, and interact with the binder. In fact, the wastes carry along with them their content of ions or heavy metals, which disturb the setting and hardening phenomenons, and give rise to swelling and expansion which causes subsequent fracture or cracking of the material. The leach resistance is considerably decreased. Such problems tend to render ineffective the stabilization of waste incineration residues by hydraulic binders according to the above systems.

In a third alternative, it was proposed to condition the waste incineration residues in at least two stabilization steps: a first step in which the residues are mixed with a hydraulic binder and possibly various reagents to trap the environment-unfriendly elements chemically or physically, followed by a second step, designed to reinforce the action of the hydraulic binder used in the first step, which consists of providing a barrier to prevent leaching phenomenons. Depending on each specific case, the barrier may be obtained by coating using a composition based on a hydraulic binder such as water and cement, or an organic binder such as a stearate or bitumen. Many special systems have been proposed, describing the two-step conditioning of waste incineration residues. One such solution has been described in particular in Japanese Patent Application No. 61.0910050, in International Application No. 89/12498, and in German Patent No. 3.808.187.

Japanese Patent Application No. 61.09 10050 concerns a method for the fabrication of aggregates or fillers for concrete, using incineration ash. By this method, the ash is crushed, mixed with cement (about 40% by weight) and treated until the cement is partly or completely hardened. The concrete thus obtained is then reduced by crushing to particles, which are again mixed with cement (about 40% by weight) and possibly sand. After hardening, another reaction is carried out by crushing to obtain particles of predetermined size or aggregates, which are then used to make concrete.

This solution is however uneconomic because it comprises several crushing steps and requires large quantities of cement. It tends to solve the problems of setting and hardening mentioned above, by diluting the wastes in cement. Due to the crushing operations, interactions with the hydraulic binder and harmful elements for setting and hardening of the binder are favored, both in the first step and in the second. This is why it is not possible to achieve effective stabilization of all the wastes in a dense structure, and if these harmful elements are present.

According to International Application No. 89/12498, the waste incineration residues are combined with a treatment agent for heavy metals such as diatomaceous clay, to which Portland cement is preferably added, and the granulates obtained are then coated with a cement composition.

Even in this case, however, the harmful elements for setting and hardening present in the residues, such as $Cl-_4$, $SO_4$—ions, . . . can hinder the hydration of the cement used to form the granulates, and consequently the cement making up the coating shell, at least at the periphery of the shell in contact with the granulate. This leads to an absence of a physical or chemical bond between the granulate and the coating shell, causing embrittlement of the latter, which could accordingly break in the case of impact, deformation or strong expansion.

The solution proposed by German Patent No. 3.808.187 consists of crushing the wastes, subjecting them to treatment with lime, followed by granulation under pressure, heat treatment and crushing. The mixture obtained is then mixed with cement, and again granulated.

These solutions leave the problems mentioned above unresolved, or require even more cumbersome treatments to attempt to solve them.

The methods described in the prior art hence do not take account of the variety of the residue compositions and are hence only feasible with restricted ranges of products to be treated.

This means that, so far, no method for the treatment of waste incineration residues has yet been proposed that is simple, applicable to all incineration wastes, and also effective in so far as it guarantees effective stabilization in terms of environmental pollution, in the short, medium and long term. The present invention is therefore aimed to remedy the drawbacks mentioned above and to propose such a treatment method.

SUMMARY OF THE INVENTION

More specifically, the object of the invention is a method for the treatment of urban or industrial waste incineration residues, comprising the following steps:
a first step of chemical analysis of the urban or industrial waste incineration residues in order to determine:
their water-soluble sulfate content,
the overall retarding or accelerating action of the water-soluble ions which could hinder the setting or hardening of hydraulic binder, e.g., a Portland cement,
a second step in which the urban or industrial waste incineration residues are mixed or crushed, with said hydraulic binder and additives, followed by granulation with water of the mixture obtained, with the granules then left to harden, the nature and proportion of said hydraulic binder and said additives having been selected in order to allow both the physical and/or chemical neutralization of the harmful elements for setting or hardening of said hydraulic binder present in the wastes, as well as the production of granules with low porosity and low permeability.

The term granules must be understood as including all products produced by granulation, pelletizing, extrusion, aggregation operations, or any other similar operation known to the man skilled in the art.

In accordance with the invention, it is possible to treat all types of incineration residue.

Soots or filter cakes have variable dimensions, but are generally about 1 cm or less in size. They can therefore be treated as such.

Other residues must first be crushed if their average dimensions are too large, in order to reduce their dimensions preferably to a value of 1 cm or less.

The method according to the invention serves advantageously to neutralize the ions liberated in solution by the waste incineration residues, and which could be harmful to the hydration of a hydraulic binder, such as, for example Portland cement, using said hydraulic binder and suitable additives, determined after the analysis in the first step. Thus, in the following description, when "Portland cement" is mentioned, it is to be understood that it is merely used as an example of the hydraulic binder that can be employed in this invention.

Thanks to the first and second steps of the method according to the invention, a hydraulic binder, various additives and water are used for the simple fabrication of granules with low porosity and low permeability, whose mechanical properties allow their handling in normal conditions, without any risk of fracture or cracking.

Simultaneously, it was surprising to find that, in the granules according to the invention, a large part of the elements harmful to the environment were fixed in a stable manner. In fact, the granules according to the invention exhibit satisfactory mechanical strength and leaching resistance, and can satisfy in some cases the requirements set for certain dumps with respect to the environment: their storing as such, i.e. without further treatment, can therefore be considered in these dumps.

The particularly advantageous results stated above are achieved according to the invention when the choice of the hydraulic binder and the additives takes account of two parameters:

the overall action of the soluble ions which are detrimental to the setting or hardening of a Portland cement released during the soaking of the waste in water, and the soluble sulfate content.

The determination of the hydraulic binder and the different additives is carried out according to the invention as follows:

samples of the incineration residue are taken and soaked in water, allowing for a ratio of the mass of water to the mass of residue of about 10, the aqueous solution is analyzed in a known manner, for example by X-ray fluorescence, or by the method known as the inductively coupled plasma (ICP) method.

The ions released are classed according to their character of accelerating or delaying the setting or hardening of a Portland cement. The main elements disturbing the hydration of this cement known to the man skilled in the art for their retarding action are zinc, phosphorus, manganese, barium, chromium, cadmium and lead. The main accelerators are chlorine, potassium, sodium and alumina.

It is also necessary to consider the associations that may occur between these ions and counter-ions themselves. Thus, for example, chloride ions are accelerators unless they are in the form of magnesium or aluminum chloride, in which case they are retarders. Similarly, sulfates induce a retarding effect in the form of calcium sulfate, whereas if associated with an alkaline metal, they act as accelerators. The results of the analysis of the solution help to compile a material and electrical balance of these ions. If the sum of the molar concentrations of the retardant ions is greater than the sum of molar concentrations of the accelerator ions, the overall action of the ions in solution is qualified as retarding. In the opposite case, the overall action is accelerating. The effect is qualified as neutral in the case of equality or virtual equality.

Soluble sulfates must also be considered a second time. This is because sulfates can cause expansion or swelling, which generally leads to the destruction of the hydraulic bonds and the cracking or pulverization of the granules. This is due to the combination of sulfate ions with aluminate ions to form ettringite or calcium sulfoaluminate hydrate.

If the soluble sulfate ion content is high, i.e. if the solution obtained by soaking the residue in water in a ratio of mass of water to mass of residue of about 10 is saturated with sulfates, the hydraulic binder selected must be of the crushed clinker type. In the opposite case, the hydraulic binder should be Portland cement, cement based on calcium sulfoaluminate, or a mixture of these two cements. It goes without saying that other cements, such as aluminous cement or magnesia cement could be used instead of Portland cement. However, their use is uninteresting from the economic standpoint due to their cost.

An additive is added to the hydraulic binder to counter the overall action of these ions. If this action is retardant, the additive must be an accelerator or a mixture of accelerators such as triethanolamine, calcium formiate, or any other accelerator for Portland cement known to the man skilled in the art. It is also possible to add aluminous cement which, mixed with a Portland cement, plays an accelerating role. However, if the hydraulic binder used is cement based on calcium sulfoaluminate, it is no longer necessary to add an accelerator.

If the overall action of the ions is accelerating, a retarder or a mixture of retarders is added, such as a sugar, sodium tripolyphosphate, a complexing of calcium, or any other retarder of the setting or hardening of a Portland cement known to the man skilled in the art.

According to the invention, the proportion of additive is generally lower than 5% of the mass of hydraulic binder, and preferably less than 2%, unless aluminous cement is used. In this case it is higher, but remains less than 30%.

The hydraulic binder containing the additive is then added to the residue in order to make a residue/binder mixture with a binder weight content between 15 and 70%, and preferably between 30 and 40% by weight.

A small proportion of water, preferably 10 to 30% water with respect to the mass of hydraulic binder containing the additive, suffices and contributes to the production of granules with low porosity and low permeability. The mixture is granulated, pelletized, extruded or aggregated in a known manner. The granules can then be left to harden in the open air or by means of any other known maturing method, such as heat treatment for example.

According to the invention, the setting and hardening of the granules in fact takes place, thanks to the choice of the hydraulic binder and the additives adapted to the wastes treated.

Unresolved problems in the prior art, such as the formation of ettringite or calcium sulfoaluminate hydrate, which occur when the soluble sulfate content is high and the overall action of the ions is retarding, are also thus solved. In fact, the use of an accelerator in this case, according to the invention, enables ettringite to form rapidly, long before the setting and hardening has begun. The mixture of hydraulic binder+additives+-wastes+water is then sufficiently elastic to withstand the dimensional variations caused by expansion. Because, if the formation of ettringite takes place after hardening, it can cause destruction of the granule.

On completion of the second step, i.e. after hardening, leach tests according to those of AFNOR Standard NF X 31-210 and described in the draft circular of 12 Jun. 1991 of the 'French Ministry for the Environment and Prevention of Major Risks' ("Ministre délégué à l'Environnement et à la Prévention des Risques Majeurs") sent to the 'Préfets' in connection with the elimination of smoke from urban waste incineration plants, are carried out on the granules as follows.

The granules are placed in water at the rate of 100 g of nodules in one liter of water for 16 h, and the water is replenished three times. The soluble fraction and the harmful elements are analyzed, and must not exceed 5% for the soluble fraction, and, for mercury, cadmium, lead, arsenic, copper, total organic carbon and chloride ion, the values are respectively 0.2, 1, 6, 2, 20 and 400 mg and 10 g per kg of residue. The objective of the invention is achieved optimally if the granules obtained on completion of the second step of the method according to the invention exhibit the following composition (expressed as a weight percentage of the total weight):

$SiO_2$ from 15 to 45%, $Al_2O_3$ from 9 to 26%, $Fe_2O_3$ from 0.5 to 10%, CaO from 9 to 53%, MgO from 1 to 7%, $Na_2O$ from 0.5% to 6%, $K_2O$ from 0.3 to 6%, sulfates from 2 to 10%, and Cl from 0.5 to 6% and minor elements at the rate of 3000 to 100,000 mg/kg of residues treated with the following weight proportion:

Zn from 40 to 70%, Pb from 1 to 30%, Cu from 0 to 5%, Sn from 1 to 5%, Ba from 0.5 to 9.52%, Cd from 0.5 to 2%, total Cr from 0.5 to 2%, Ni from 0.2 to 1%, Cd from 0.1 to 1%, Ag from 0.2 to 1%, Hg from 0.01 to 0.05%, As from 0.24 to 0.4%, Mn from 0.5 to 6%, Ti from 5 to 20%, Se from 0.01 to 0.10%, Be from 0.01 to 0.1%, V from 0.1 to 1% and F from 0.01 to 0.20%

It is then observed that their penetration resistance (hardness) measured by the Vickers method (according to AFNOR Standard A 03-150) is accordingly higher than 20 kg/cm$^2$ (2 MPa), and their compressive strength is greater than 50 kg/cm$^2$ (5 MPa). The strengths indicate that the hydraulic reactions have taken place correctly. Their high values provide indications about the quality of the leaching tests, but not certainties.

Depending on the destination of the granules, and particularly the dumping regulations, the fixation of elements that are harmful to the environment in the granules may not be sufficient.

In this case, this is completed in a third step of incorporation of the granules in a cement paste. Irrespective of the composition of the incineration residues, the granules obtained according to the invention are inert with respect to the setting or hardening of a Portland cement. In fact, the choice of the hydraulic binder and the additives has served to fix most of the components of the residue chemically or physically in the second step, and particularly the ions that are detrimental to the setting or hardening of a Portland cement.

The adaptation of the cement paste to the waste composition hence does not need to take place in this third step.

It is therefore possible, with the exception of the case in which the hydraulic binder from the second step is a cement paste of calcium sulfoaluminate and if only a cement paste based on aluminous cement can be used, to prepare the cement paste of the third step from any cement. However, Portland cement is preferably selected because it helps to obtain high mechanical strength economically, both in the short term and the long term.

The incorporation of the granules in an impermeable matrix in this third step completes the physical fixation of the ions that have not been fixed in the second step. To achieve this, the granules are incorporated in the quantity of cement paste necessary and sufficient to complete their coating.

The cement paste may contain additives such as plasticizers or water-reducing plasticizers. The cement paste may also contain additions of average size of 100 μm or less, such as silica fumes or fillers. Particles of average size greater than 100 μm should be avoided in order to create an effective physical barrier against the diffusion of harmful elements, and in the form of a dense matrix. The diffusion barrier thus formed by the low porosity impermeable matrix imprisons the heavy metals and other substances that are harmful to the environment, such as chlorine. The possibility of producing this high-performance cement matrix results from the treatment according to the invention carried out in the first and second steps.

The mixing, setting and hardening conditions of this cement paste are advantageously those leading to the production of a concrete with low porosity and low permeability. Thus the weight ratio of water to cement in the cement paste generally ranges between 0.3 and 0.7.

For the same purpose, a weight ratio of granules to cement paste is determined in a manner known per se, particularly as a function of the grain size distribution of the granules.

The leach resistance of the concrete obtained is greater than the values given in the draft circular mentioned above.

The concrete obtained on completion of the third step exhibits a high compressive strength of about 1 to 5 MPa, and possibly higher than 5 MPa.

As an illustration, the table below gives different embodiments of the invention. According to the analytical results obtained, it lists the hydraulic binders and adapted additives which ensure that the hydration of the binder leads to granules with low porosity and low permeability.

This table also indicates the type of cement paste that could be suitable for coating the granules if the third step proves necessary to strengthen the leach resistance of the granules.

|  | First step | | | | | |
|---|---|---|---|---|---|---|
| soluble sulfate content | − | − | + | − | − | + |
| overall action | − | − | + | − | − | + |
| origin of wastes | DM SDM SWM | DM SDM SWM | WM | DM SWM SDM | SWM SDM DM | WM |
|  | Second step | | | | | |
| hydraulic binder | PC | CSA | PC | CK | CK | CK |
| addition | AC | − | ret | accel | AC | ret |
|  | Third step | | | | | |
| cement paste | PC | AC | PC | PC | PC | PC |

Key
− overall retardant action of waste incineration residues
+ overall accelerating action of waste incineration residues
DM dry method
SDM semi-dry method
SWM semi-wet method
WM wet method
PC Portland cement
CSA calcium sulfoaluminate base cement
CK crushed Portland cement clinker
AC aluminous cement
accel accelerator addition
ret retardant addition The invention can be better understood with the help of the following non-limitative examples in which:
the proportions of hydraulic binder are expressed as mass percentages of hydraulic binder (additive included) related to the mass of mixture of residue+binder,
the proportions of additive are expressed as mass percentages of additive related to the mass of hydraulic binder and additive,
the proportions of water are expressed as mass percentages of water related to the mass of hydraulic binder and additive.

EXAMPLE 1

An incineration residue of household refuse obtained by the dry method (soot or ash) contains 5200 mg of Pb per kg of residue, 360 mg of Cd per kg of residue, 60 mg of Hg per kg of residue and 2500 mg of Zn per kg of residue, plus 70,000 mg of chlorine per kg of residue and organic matter. Standard leach tests (AFNOR Standard X 31-210) show a soluble fraction of 25% according to the above Standard, and dissolution rates (for a total of three leachings) of 5 mg of Pb per kg of residue treated, 3 mg of Cd per kg of residue, 6 mg of Hg per kg of residue, and 3 mg of Zn per kg of residue, and 60,000 mg of chlorine per kg of residue.

The analysis having shown that the soluble sulfate content is not sufficiently high to cause subsequent swelling phenomenons and that the overall action of the ions is retarding, the residue is mixed with Portland cement (50% of Portland cement and 50% of waste) and a hardening accelerator based on calcium aluminates (30% of aluminous cement with the following mineralogical composition: 50% monocalcium aluminate, 10% dodecalcium hepta-aluminate, normally called C12A7, and 30% calcium aluminoferrite), and mixed with 15% of water. After air-hardening, the granules obtained by this mixture have a penetration resistance of 37.2 kg/cm$^2$ for the exterior of the granule and 32.2 kg/cm$^2$ for the interior, measured according to AFNOR Standard A 03-150 (Vickers method). These resistances show that the hydraulic reactions have taken place correctly, but the leach tests on the granules reveal a chlorine dissolution of 2000 mg/liter. The next step is therefore necessary.

The granules are therefore taken up and stabilized in a cement matrix where they play the role of a neutral filler. The quantity of cement is the amount necessary to coat all the granules, 150 kg per m$^3$ of material produced.

The two-day compressive strength of the blocks thus formed is 120 kg/cm$^2$. The AFNOR leach test, Standard X 31-210, modified on prisms measuring 4×4×8 cm, gives a soluble fraction of less than 5% and extraction rates lower than the detection limit of the analytical instruments. The diffusion coefficients of the chlorine ions in the matrix are:

255,500·$^{-9}$ cm$^2$/s at 20° C.
428,400·$^{-9}$ cm$^2$/s at 30° C.

These measurements are taken by the diffusion cell method. The sample (50 mm diameter disc of 5 mm thick) delimits two compartments in the diffusion cell. One compartment contains a solution saturated with lime, and the second a solution saturated with lime with sodium chloride added. Samples are taken periodically and the chlorine is analyzed, making it possible to determine the diffusion coefficient of chlorine across a given sample.

EXAMPLE 2

Household refuse incineration soots produced by the dry method are analyzed.

Their chemical composition is similar to that of the soots in Example 1. Since the soluble sulfate content is not sufficiently high to cause subsequent swelling and the overall action of the ions is retarding, the soots are mixed with Portland cement with chemical composition:

| | | |
|---|---|---|
| SiO$_2$ = 21.8% | CaO = 66.6% | Al$_2$O$_3$ = 6.25% |
| Fe$_2$O$_3$ = 2.3% | MgO = 1.1% | sulfates = 3.5% |
| K$_2$O = 0.40% | Na$_2$O = 0.07% | TiO$_2$ = 0.31% |
| Mn$_2$O$_3$ = 0.04% | P$_2$O$_5$ = 0.10% | | with a hardening accelerator based on calcium aluminates (30% aluminous cement with a mineralogical composition identical to that employed in Example 1) and 15% of water.

After air-hardening, the particles have a mean penetration resistance of 35 kg/cm$^2$(AFNOR Standard A 03-150). These resistances show that hydration of the cement has taken place correctly. However, the leach tests still reveal chlorine ions in solution (3000 mg/liter) measured by ICP (inductively coupled plasma) and are therefore unsatisfactory.

The granules are then taken up and stabilized in a cement matrix where they play the role of an inert filler. This cement matrix contains 156 kg of Portland cement per m$^3$ of final product and the water/cement ratio is 0.69.

The permeability of the concrete obtained is 8.10$^{-12}$ m/s in the measurement operating conditions described in Example 1. The salting out test AFNOR Standard X 31-210 modified on prisms measuring 4×4×8 cm gives a soluble fraction of less than 5% and extraction rates lower than the detection limit of the analysis instruments.

EXAMPLE 3

Household refuse incineration soots produced by the dry method are analyzed.

Their chemical composition is similar to that of the soots in Example 1. Since the soluble sulfate content is not sufficiently high to cause subsequent swelling, and the overall action of the ions is retarding, the soots are mixed with Portland cement (35%) and the hardening accelerator based on calcium aluminates (15%) and then granulated with 15% of water. After air-hardening, the granules have a mean penetration resistance of 35 kg/cm$^2$ (AFNOR test in Standard A 03-150) and the following chemical composition (expressed as weight percentages):

| | | |
|---|---|---|
| SiO$_2$ = 22.3% | CaO = 33.45% | Al$_2$O$_3$ = 21.66% |
| Fe$_2$O$_3$ = 6.74% | MgO = 3.15% | sulfates = 4.02% |
| K$_2$O = 1.85% | Na$_2$O = 2.25% | Cl = 2.5% | and expressed in mg/kg of granules:

| | | |
|---|---|---|
| Zn = 9124 | Pb = 3553 | Cu = 406 |
| Sn = 820 | Ba = 1512 | Cd = 150 |
| total Cr = 250 | Ni = 50 | Co = 17 |
| Ag = 170 | Hg = 4 | As = 39 |
| Mn = 750 | Ti = 3500 | Se = 8 |
| Be = 13 | V = 50 | F = 63 |

The high penetration resistances show that the hydration reactions have taken place correctly, but the leach tests on granules are unsatisfactory and indicate the need to proceed with the third step.

The granules are therefore taken up and stabilized in a concrete where they play the role of a granulate. The quantity of cement is the amount necessary to coat all the granules: 156 kg of Portland cement per m$^3$ of total concrete with a water/cement ratio of 0.69.

The permeability of the concrete is $8 \cdot 10^{-12}$ m/s. The salting out test, AFNOR Standard X 31-210 modified on prisms measuring $4 \times 4 \times 8$ cm gives a soluble fraction of less than 5% and extraction rates lower than the detection limit of the analysis instruments.

EXAMPLE 4

Household refuse incineration soots obtained by the dry method are analyzed. Their chemical composition shows a sufficiently high soluble sulfate content to cause swelling of the material and an overall retarding action of the water-soluble ions. Portland cement clinker (50%) is added to these soots, together with hardening accelerator based on calcium aluminates (20%) and the soots are then granulated with 15% of water. Hardening takes place in 3 h. The granules have the following composition (expressed as weight percentages):

| | | |
|---|---|---|
| $SiO_2$ = 26.8% | CaO = 39.6% | $Al_2O_3$ = 12.3% |
| $Fe_2O_3$ = 3.22% | MgO = 3.43% | sulfates = 4.12% |
| $K_2O$ = 2.1% | $Na_2O$ = 2.32% | Cl = 2.49% | and expressed in mg/kg of granules:

| | | |
|---|---|---|
| Zn = 9200 | Pb = 355 | Cu = 206 |
| Sn = 820 | Ba = 1712 | Cd = 150 |
| total Cr = 200 | Ni = 50 | Co = 17 |
| Ag = 170 | Hg = 4 | As = 40 |
| Mn = 700 | Ti = 3000 | Se = 8 |
| Be = 10 | V = 50 | F = 63 |

Since the leach resistance of the granules is insufficient, the granules are taken up and coated in a cement barbotine containing 223 kg of cement per m³. The permeability is $28 \cdot 10^{-12}$ m/s. The salting out test, AFNOR Standard X 31-210 modified on prisms measuring $4 \times 4 \times 8$ gives a soluble fraction of less than 5% and extraction rates lower than the instrument detection limit.

EXAMPLE 5

Slags, incineration residues of household refuse, containing, after deferrization, oxides of silicon (55%), aluminum (6%), calcium (12%), sodium (8%) and miscellaneous elements in smaller proportions (Pb, Cr, Cu, Mn, Zn with values respectively of 0.2, 0.01, 0.5, 0.3 and 0.2%) reveal, after analysis, a non-high soluble sulfate content and an overall retarding action.

They are accordingly mixed with Portland cement at the rate of 70% of residue per 30% of cement. A calcium aluminate base cement, such as the one in Example 1, is added at the rate of 30% with respect to the binder.

After granulation and hardening, the granules obtained exhibit a compressive strength of 10 MPa.

However, since their leach resistance is unsatisfactory, they are coated in a low porosity Portland cement base matrix (150 kg of cement per m³).

EXAMPLE 6

Slags, incineration residues of household refuse, with a composition identical to that of Example 5, are granulated with Portland cement (50%) in the presence of a sodium formiate base accelerator (1%).

As soon as the hardening is sufficient (10 MPa), the granules are analyzed. Their chemical composition is the following (expressed as weight percentages):

| | | |
|---|---|---|
| $SiO_2$ = 38.5% | CaO = 38.6% | $Al_2O_3$ = 5.9% |
| $Fe_2O_3$ = 6.1% | MgO = 1.54% | sulfates = 3.17% |
| $K_2O$ = 0.96% | $Na_2O$ = 4.09% | Cl = 0.2% | and expressed in mg/kg of granules:

| | | |
|---|---|---|
| Zn = 100 | Pb = 35 | Cu = 1 |
| Sn = 30 | Ba = 1812 | Cd = 150 |
| total Cr = 20 | Ni = 55 | Co = 17 |
| Ag = 180 | Hg = 4 | As = 85 |
| Mn = 700 | Ti = 1200 | Se = 8 |
| Be = 10 | V = 50 | F = 125 |

Since the leach resistances are insufficient, they are coated in a low porosity Portland cement base matrix (150 kg of cement per m³).

EXAMPLE 7

Household waste incineration soots produced by the dry method, with similar compositions to those of Example 1, are added with calcium sulfoaluminate base binder in a proportion of 50% of binder with respect to the total weight of the mixture.

After air-hardening, the particles have a mean penetration resistance of 35 kg/cm².

The particles are then taken up and stabilized in a calcium aluminate cement base matrix. The salting out test, AFNOR Standard X 31-210 modified, on prisms measuring $4 \times 4 \times 8$ cm gives a soluble fraction of less than 5% and extraction rates lower than the detection limit of the analysis instruments.

EXAMPLE 8

Household refuse incineration soots produced by the dry method are analyzed.

Their chemical composition is similar to that of the soots in Example 1.

Since the soluble sulfate content is not sufficiently high to cause subsequent swelling, and the overall action of the ions is retarding, calcium sulfoaluminate base binder (50%) is added to the soots, and the soots are granulated with 13.5% of water.

After air-hardening, the particles have a mean penetration resistance of 35 kg/cm². The granules then have the following chemical composition (expressed as weight percentages):

| | | |
|---|---|---|
| $SiO_2$ = 21.55% | CaO = 34.6% | $Al_2O_3$ = 22.48% |
| $Fe_2O_3$ = 2.27% | MgO = 2.88% | sulfates = 10.17% |
| $K_2O$ = 1.6% | $Na_2O$ = 2.17% | Cl = 2.49% | and expressed in mg/kg of granules:

| | | |
|---|---|---|
| Zn = 9500 | Pb = 3500 | Cu = 106 |
| Sn = 1020 | Ba = 1812 | Cd = 150 |
| total Cr = 200 | Ni = 55 | Co = 17 |
| Ag = 180 | Hg = 4 | As = 40 |
| Mn = 700 | Ti = 3500 | Se = 8 |
| Be = 10 | V = 50 | F = 63 |

The granules, which do not satisfy the leach conditions, are then taken up and stabilized in a calcium aluminate base matrix (proportioning 160 kg/m3). The salting out test, AFNOR Standard X 31-210 modified, on prisms measuring $4 \times 4 \times 8$ cm gives a soluble fraction of less than 5% and extraction rates lower than the detection limit of the analysis instruments.

EXAMPLE 9

A household refuse incineration residue produced by the semi-dry method contains 8200 mg of Pb per kg of residue, 300 mg of Cd per kg of residue, 45 mg of Hg per kg of residue, 2500 mg of Zn per kg of residue, 170,000 mg of chlorine per kg of residue and organic matter. The standard leach tests (AFNOR Standard X 31-210) reveal a soluble fraction of 45% and salting out rates (for a total of three leachings) of 7 mg of Pb per kg of residue, 6 mg of Cd per kg of residue, 6 mg of Hg per kg of residue, 10 mg of Zn per kg of residue, and 160,000 mg of chlorine per kg of residue.

Since the soluble sulfate content is not sufficiently high to cause swelling of the material, and the overall action of the ions is retarding, the residue is added with Portland cement at the rate of 55% of residue for 45% of binder, a hardening accelerator based on calcium aluminate (15% for 85% of Portland cement) and then humidified with 15% of water. After agglomeration and air-hardening, the agglomerates have a mean penetration resistance (hardness) of 35 kg/cm$^2$.

They are then taken up and coated with cement where they play the role of a filler. The two-day compressive strength is 180 kg/cm$^2$ and the permeability in the operating conditions described in Example 1 is 13.5%. The leach test, AFNOR Standard X 31-210 modified, on prisms measuring $4\times4\times8$ cm gives a soluble fraction of less than 5% and extraction rates lower than the detection limit of the analysis instruments.

EXAMPLE 10

A household refuse incineration residue produced by the semi-wet method contains 8400 mg of Pb per kg of residue, 370 mg of Cd per kg of residue, 360 mg of Hg per kg of residue, 24,000 mg of Zn per kg of residue, 190,000 mg of chlorine per kg of residue and organic matter. The standard leach tests (AFNOR Standard X 31-210) reveal a soluble fraction of 43% and salting out rates (for a total of three leachings) of 5 mg of Pb per kg of residue, 3 mg of Cd per kg of residue, 6 mg of Hg per kg of residue, 3 mg of Zn per kg of residue and 60,000 mg of chlorine per kg of residue.

Since the soluble sulfate content is insufficiently high to cause subsequent swelling, and the overall action of the ions is retarding, the residue is added with Portland cement (50% of residue for 50% of binder) and a hardening accelerator based on calcium aluminate (25% for 75% of Portland cement) and then granulated with 13% of water.

After air-hardening, the granules have a penetration resistance of 36 kg/cm$^2$.

However, since their leach resistance is insufficient, the granules are then taken up and stabilized in a Portland cement grout. The two-day compressive strength is 150 kg/cm$^2$. The leach test, AFNOR Standard X 31-210, modified on prisms measuring $4\times4\times8$ cm gives a soluble fraction of less than 5% and extraction rates lower than the detection limit of the analysis instruments.

EXAMPLE 11

A household refuse incineration residue produced by the wet method, which will be hereinafter referred to as 'filter cake', contains 3200 mg of Pb per kg of residue, 160 mg of Cd per kg of residue, 360 mg of Hg per kg of residue, 9500 mg of Zn per kg of residue, 10,000 mg of chlorine per kg of residue and organic matter. The standard leach tests (AFNOR Standard X 31-210) reveal a soluble fraction of 20% and salting out rates (for a total of three leachings) of 5 mg of Pb per kg of residue, 0.3 mg of Cd per kg of residue, 0.6 mg of Hg per kg of residue, 3 mg of Zn per kg of residue and 10,000 mg of chlorine per kg of residue.

Since the soluble sulfate content is insufficiently high to cause subsequent swelling, and the overall action of the ions is retarding, the residue is added with Portland cement (70% of residue for 30% of binder) and a hardening accelerator based on calcium aluminates (30% for 70% of Portland cement), and then granulated with 10% of water. After hardening, the granules have a penetration resistance of 36 kg/cm$^2$.

Since their leach resistance is insufficient, these granules are then taken up and stabilized in a Portland cement base matrix, where they play the role of a filler. The two-day compressive strength is 100 kg/cm$^2$. The leach test, AFNOR Standard X 31-210 modified, on prisms measuring $4\times4\times8$ cm, gives a soluble fraction of less than 5% and extraction rates lower than the detection limit of the analysis instruments.

EXAMPLE 12

A filter cake with the same characteristics as those in Example 11 is added with Portland cement (30% of binder for 70% of residue) and a hardening accelerator based on calcium aluminates (30% for 70% of Portland cement) and then extruded with 10% of water and cut into cylinders about 5 cm long.

After hardening, the cylinders have a penetration resistance of 30 kg/cm$^2$ but do not satisfy the leach tests.

They are accordingly taken up and stabilized in a Portland cement base concrete (proportioning 156 kg/m3). The one-day compressive strength of the concrete is 100 kg/cm$^2$. The leach test, AFNOR Standard X 31-210 modified, on prisms measuring $4\times4\times8$ cm gives a soluble fraction of less than 5% and extraction rates lower than the detection limit of the analysis instruments.

EXAMPLE 13

A filter cake contains 3200 mg of Pb per kg of cake, 160 mg of Cd per kg of cake, 360 mg of Hg per kg of cake, 9500 mg of Zn per kg of cake, 10,000 mg of chlorine per kg of cake and organic matter. The standard leach tests (AFNOR Standard X 31-210) reveal a soluble fraction of 20% and salting out rates (for a total of three leachings) of 5 mg of Pb per kg of cake treated, 0.3 mg of Cd per kg of cake, 0.6 mg of Hg per kg of cake, 3 mg of Zn per kg of cake and 10,000 mg of chlorine per kg of cake.

Since the soluble sulfate content is insufficiently high to cause subsequent swelling, and the overall action of the ions is retarding, the filter cake is added with Portland cement (30% of binder for 70% of residue) and a hardening accelerator based on calcium aluminate (30% for 70% of Portland cement), and then granulated with 10% of water.

After hardening, since the granules exhibit insufficient leach resistance, they are taken up and immersed in a cement matrix. The cement matrix is composed of Portland cement (100 kg/m3), sand (grain size less than 100 $\mu$m) and an air-entraining agent (1% of cement+sand mixture). The leach test, AFNOR Standard X 31-210 modified, on prisms measuring $4\times4\times8$ cm gives a soluble fraction of less than 5% and extraction rates lower than the detection limit of the analysis instruments.

EXAMPLE 14

A filter cake with the same characteristics as those in Example 11 is analyzed. Since the soluble sulfate content is insufficiently high to cause swelling of the material, and the overall action of the ions is retarding, the cake is added with Portland cement (30% of binder for 70% of residue) and a hardening accelerator based on calcium aluminates (30% for 70% of Portland cement), and then granulated with 10% of water.

After hardening, since the granules display insufficient leach resistance, they are taken up and stabilized in a very high performance concrete containing silica fumes and a plasticizer (melamine). The porosity, measured by the conventional method using a mercury porosimeter, is 12%, and the permeability is $28 \cdot 10^{-12}$ m/s. The leach test, AFNOR Standard X 31-210 modified, on prisms measuring $4 \times 4 \times 8$ cm gives a soluble fraction of less than 5% and extraction rates lower than the detection limit of the analysis instruments.

EXAMPLE 15

A filter cake with identical characteristics to those in Example 11 is added with Portland cement (30% of binder for 70% of residue) and a hardening accelerator based on calcium aluminate (30% for 70% of Portland cement), and then granulated with 10% of water. The granules are hardened by passage through the autoclave.

After hardening, since the granules exhibit insufficient leach resistance, they are taken up and stabilized in a very high performance Portland cement matrix containing silica fumes (10% with respect to the binder) and a plasticizer (1% with respect to the binder). The porosity is 12% and the permeability is $28 \cdot 10^{-12}$ m/s. The leach test, AFNOR Standard X 31-210 modified, on prisms measuring $4 \times 4 \times 8$ cm give a soluble fraction of less than 5% and extraction rates lower than the detection limit of the analysis instruments.

Example 16

A filter cake with identical characteristics as those in Example 11 is added with Portland cement (50% of binder for 50% of residue) and a hardening accelerator based on calcium aluminates (30% for 70% of Portland cement), and then granulated with 10% of water. The granules thus obtained are hardened by carbonation in an oven.

After hardening, the granules are then taken up and stabilized in a high performance concrete containing silica fumes (8% with respect to the binder) and a lignosulfate base plasticizer (1% with respect to the binder). The porosity is 13% and the permeability is $25 \cdot 10^{-12}$ m/s. The leach test, AFNOR Standard X 31-210 modified, on prisms measuring $4 \times 4 \times 8$ cm gives a soluble fraction of less than 5% and extraction rates lower than the detection limit of the analysis instruments.

EXAMPLE 17

A filter cake with identical characteristics as those in Example 11 is added with Portland cement (30% of binder for 70% of residue) and a hardening accelerator based oil calcium aluminates (30% for 70% of Portland cement), and then granulated with 10% of water. The agglomerates are hardened by storage in air.

After hardening, since the agglomerates exhibit insufficient leach resistance, they are therefore taken up and stabilized in a Portland cement grout. The leach test, AFNOR Standard X 31-210 modified, on prisms measuring $4 \times 4 \times 8$ cm gives a soluble fraction of less than 5% and extraction rates lower than the detection limit of the analysis instruments.

EXAMPLE 18

Soots produced by the dry method contain 2000 mg of Pb per kg of soot, 100 mg of Cd per kg of soot, 9 mg of Hg per kg of soot, 7500 mg of Zn per kg of soot, 20,000 mg of chlorine per kg of soot and organic matter. The standard leach tests (AFNOR Standard X 31-210) reveal a soluble fraction of 25% and salting out rates (for a total of three leachings) of 200 mg of Pb per kg of soots treated, 3 mg of Cd per kg of soots treated, 0.6 mg of Hg per kg of soots treated, 230 mg of Zn per kg of soots treated and 15,000 mg of chlorine per kg of soots treated.

Since the soluble sulfate content is insufficiently high to cause subsequent swelling, and the overall action of the ions is retarding, the soots are mixed with Portland cement (65%) and a hardening accelerator based on calcium aluminates (30% of melted cement), and then mixed with 15% of water and granulated.

After air-hardening, the granules have a penetration resistance of 35 kg/cm$^2$. A test of the particles gives a soluble fraction of less than 4% and extraction rates lower than the instrument detection limit.

The third step is hence unnecessary, and the particles can be dumped without further treatment.

What we claim is:

1. A method for the treatment of incineration residues of urban or industrial wastes, said method comprising:
    a first step of chemical analysis of the incineration residues in order to determine their water-soluble sulfate content and the overall retarding or accelerating action of the water-soluble ions, which could hinder the setting or hardening of a hydraulic binder, and
    a second step comprising mixing the urban or industrial waste incineration residues with water, a hydraulic binder and additives, followed by forming granules with the resultant mixing water, hardening the resultant granules, the nature and proportion of said hydraulic binder and said additives having been selected in order to allow neutralization of the harmful elements for setting or hardening of said hydraulic binder present in the wastes, as well as the production of granules with low porosity and low permeability.

2. A method as claimed in claim 1, wherein the hydraulic binder of the second step is crushed clinker when the solution, obtained by soaking the residue in water, according to a ratio of mass of water to mass of residue of about 10, is saturated with sulfates.

3. A method as claimed in claim 1, wherein the hydraulic binder of the second step is Portland cement, magnesia cement, aluminous cement, calcium sulfoaluminate base cement, or a mixture of these cements, when the solution, obtained by soaking 100 g of residue per liter of water, is not saturated with sulfates.

4. A method as claimed in claim 1, wherein when the overall action of the soluble ions is retarding, the additive comprises an accelerator for hardening said hydraulic binder.

5. A method as claimed in claim 1, wherein when the overall action of the soluble ions is accelerating, the additive is a retardant for delaying the hardening of said hydraulic binder.

6. A method as claimed in claim 1, wherein the additive is added in a weight proportion of not more than 5% with respect to the hydraulic binder, unless it is aluminous cement, in which case it is added in a proportion of less than 30%.

7. Method as claimed claim 1, wherein the second step includes the addition of 10 to 30% by mass of water with respect to the quantity of hydraulic binder and of additive.

8. A method as claimed in claim 1, wherein the content of the hydraulic binder containing the additive is between 15 and 70%, with respect to the mass of mixture of residue+binder.

9. A method as claimed in claim 1, wherein the forming of the granules in the second step is conducted by granulation, pelletizing, extrusion, or agglomeration.

10. A method as claimed in claim 1, wherein the hardening of the granules takes place or by maturation.

11. A method as claimed in claim 1, wherein further comprising a third step of incorporating of the granules in a cement paste.

12. A method as claimed in claim 11, wherein the mass ratio of water to cement in the third step is between 0.3 and 0.7.

13. A method as claimed in claim 11, wherein the cement paste of the third step contains additives selected from the group consisting of plasticizers and fillers, said fillers having an average particle size of not more than 100 μm, and mixtures thereof.

14. The granules prepared according to claim 1.

15. The granules according to claim 14 wherein they exhibit the following composition:

| | | |
|---|---|---|
| $SiO_2$ from 15 to 45% | CaO from 9 to 53% | $Al_2O_3$ from 9 to 26% |
| $Fe_2O_3$ from 0.5 to 10% | MgO from 1 to 7% | sulfates from 2 to 10% |
| $K_2O$ from 0.3 to 6% | $Na_2O$ from 0.5 to 6% | Cl from 0.5 to 6% | and minor elements at the rate of 3000 to 100,000 mg/kg of residues treated with the following weight proportion:

| | | |
|---|---|---|
| Zn from 40 to 70% | Pb from 1 to 30% | Cu from 0 to 5% |
| Sn from 1 to 5% | Ba from 0.5 to 9.52% | Cd from 0.5 to 2% |
| total Cr from 0.5 to 2% | Ni from 0.2 to 1% | Co from 0.1 to 1% |
| Ag from 0.2 to 1% | Hg from 0.01 to 0.05% | As from 0.24 to 0.4% |
| Mn from 0.5 to 6% | Ti from 5 to 20% | Se from 0.01 to 0.10% |
| Be from 0.01 to 0.1% | V from 0.1 to 1% | F from 0.01 to 0.20% | and wherein their penetration resistance (hardness measured by the Vickers method, according to Standard NF A 03-150) is higher than 20 kg/cm$^2$ and wherein their compressive strength is higher than 50 kg/cm$^2$.

16. The concretes prepared according to claim 11.

17. Concretes incorporating the granules defined in claim 16 in a cement paste.

18. A method for the treatment of incineration residues of urban or industrial waste, said method comprising:

a first step of providing an urban or industrial waste incineration residue having been analyzed for water-soluble sulfate content and the overall retarding or accelerating action of the water-soluble ions, which could hinder the setting or hardening of a hydraulic binder, and a second step in which the urban or industrial waste incineration residues are mixed with water, a hydraulic binder and additives, followed by forming granules with the resultant mixing water and hardening the resultant granules, the nature and proportion of said hydraulic binder and said additives having been selected in order to allow the neutralization of the harmful elements for setting or hardening of the hydraulic binder present in the wastes, as well as the production of granules with low porosity and low permeability.

19. A method according to claim 8, wherein the content of the hydraulic binder is between 30% and 40%.

20. A method according to claim 3, wherein the hydraulic binder of the second step is an aluminous cement.

21. A method according to claim 4, wherein the additive is an accelerator and is an aluminous cement.

22. A method according to claim 5, wherein the additive is a retardant and comprises calcium chelatants.

23. A method according to claim 1, wherein the residues are subjected to crushing before the mixing step.

24. A method according to claim 1, wherein the additives are selected in order to allow physical neutralization of the harmful elements.

25. A method according to claim 1, wherein the additives are selected in order to allow chemical neutralization of the harmful elements.

26. A method according to claim 1, wherein the hydraulic binder is a Portland cement.

27. A method according to claim 4, wherein the accelerator comprises at least one accelerator selected from the group consisting of triethanolamine, calcium formiate, and an aluminous cement.

28. A method according to claim 27, wherein the hydraulic binder is Portland cement.

29. A method according to claim 5, wherein the retardant comprises a sugar, sodium tripolyphosphate, or a calcium chelatant.

30. A process according to claim 29, wherein the hydraulic binder is a Portland cement.

31. A method according to claim 18, wherein the hydraulic binder is Portland cement.

32. A method according to claim 10, wherein the hardening of the granules takes place in air.

33. A method as claimed in claim 11, wherein the first step of the process provides a low soluble sulfate content and an overall retarding action of waste incineration residue coming from a dry, semi-dry, or semi-wet method of production, the second step comprises an addition of Portland cement and aluminous cement, and the third step is an addition of Portland cement.

34. A method as claimed in claim 11, wherein the first step of the process determines a low soluble sulfate content and an overall retarding action of a waste incineration residue coming from a dry, semi-dry, or semi-wet method of production, the second step comprises an addition of calcium sulfoaluminate base cement, and the third step comprises an addition of an aluminous cement.

35. A method as claimed in claim 11, wherein the first step of the process determines a low soluble sulfate content and an overall accelerating action of a waste incineration residue coming from a wet method of production, the second step comprises an addition of Portland cement and retardant, and the third step comprises an addition of Portland cement.

36. A method as claimed in claim 11, wherein the first step of the process determines a high soluble sulfate content and an overall retarding action of a waste incineration residue coming from a dry, semi-dry, or semi-wet method of production, the second step comprises an addition of crushed Portland cement clinker and an accelerator, and the third step comprises an addition of Portland cement.

37. A method as claimed in claim 11, wherein the first step of the process determines a high soluble sulfate content and an overall retarding action of a waste incineration residue coming from a dry, semi-dry, or semi-wet method of production, the second step comprises an addition of crushed Portland cement clinker and an aluminous cement, and the third step comprises an addition of Portland cement.

38. A method as claimed in claim 11, wherein the first step of the process determines a high soluble sulfate content and an overall accelerating action of a waste incineration residue coming from a wet method of production, the second step comprises an addition of crushed Portland cement clinker and a retardant, and the third step comprises an addition of Portland cement.

* * * * *